(12) United States Patent
Ukita et al.

(10) Patent No.: US 8,305,314 B2
(45) Date of Patent: Nov. 6, 2012

(54) LIQUID CRYSTAL DISPLAY APPARATUS AND METHOD FOR RESTRAINING A BRIGHT POINT

(75) Inventors: Toru Ukita, Kawasaki (JP); Takeshi Sasaki, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 562 days.

(21) Appl. No.: 12/619,127

(22) Filed: Nov. 16, 2009

(65) Prior Publication Data

US 2010/0128060 A1 May 27, 2010

(30) Foreign Application Priority Data

Nov. 21, 2008 (JP) .................................. 2008-298493

(51) Int. Cl.
*G09G 3/36* (2006.01)
(52) U.S. Cl. ........................................ 345/87; 349/192

(58) Field of Classification Search ........................ None
See application file for complete search history.

(56) References Cited

U.S. PATENT DOCUMENTS

| 5,877,844 A * | 3/1999 | Matsumoto ...................... 355/35 |
| 8,164,598 B2 * | 4/2012 | Kimpe ........................... 345/629 |
| 2004/0036701 A1 * | 2/2004 | Wolfe ............................ 345/672 |
| 2007/0126945 A1 * | 6/2007 | Tashiro ............................ 349/54 |

FOREIGN PATENT DOCUMENTS

JP        3565327 B2     9/2004

* cited by examiner

*Primary Examiner* — Joseph Haley
(74) *Attorney, Agent, or Firm* — Sughrue Mion, PLLC

(57) ABSTRACT

A sheet presence detecting apparatus includes a plurality of dots including a control area whose display state can be controlled and at least one dot with a bright point including the control area whose display state is controlled to be in an always black state and a bright point area which is always bright.

18 Claims, 8 Drawing Sheets

DEFECTIVE DOT

BRIGHT POINT AREA

DEFECTIVE DOT

ORDER OF PRIORITY REGARDING BLACKENING PROCESS FOR ADJACENT DOTS

Related Art

Fig.9

LIQUID CRYSTAL DISPLAY APPARATUS AND METHOD FOR RESTRAINING A BRIGHT POINT

INCORPORATION BY REFERENCE

This application is based upon and claims the benefit of priority from Japanese Patent Application No. JP 2008-298493, filed on Nov. 21, 2008, the disclosure of which is incorporated herein in its entirety by reference.

BACKGROUND OF THE INVENTION

1. Technical Field

The present invention relates to a liquid crystal display apparatus and a method for restraining a bright point, and in particular, relates to a liquid crystal display apparatus to make the bright point which is generated due to a tiny foreign material unnoticeable and a method for making the bright point unnoticeable.

2. Background Art

In recent years, there is an increasing demand for enhancing quality of a liquid crystal display apparatus which uses TFT (Thin Film Transistor) as a switching element. Among of the increasing demands for enhancing quality, one of the most noticeable quality degradation is a bright point. The bright point is a light leakage point which is visible at a state that an image in half-tone or black is displayed. The bright point whose width is about several tens μm is mainly generated due to a tiny foreign material which is mingled in an assembly process of the liquid crystal display apparatus and whose width is about several μm to several tens μm or the like.

In the liquid crystal display apparatus in normally black mode, a light leakage due to refraction by the foreign material which is mingled in the assembly process of the apparatus or one due to disturbance of orientation of its liquid crystal by the foreign material is always visible as the bright point.

In case that the liquid crystal display apparatus is applied to a home television set, a PC monitoring device or the like, the bright point with the very small size which is several % of size of a unit pixel or a dot which composes an image has not been regarded as a defective indication.

However, in case that it is applied to a high quality display, for instance, a medical monitoring device, the bright point is regarded as a defective indication even if its size is tiny. The reason is that a distance between user and the apparatus is short and a minute and subtle image is read from a gradation display when it is applied to the medical monitoring device.

Furthermore, a brightness of transmitted light in a monochromatic liquid crystal display apparatus is high, while that in a color liquid crystal display apparatus is attenuated by a color filter and is not so high. Therefore, when the monochromatic liquid crystal display apparatus is applied to a high quality display, the bright point is noticeable and is regarded as a defective indication.

Here, in a TFT liquid crystal display apparatus, there is a defective indication that not a part of the dot but a whole area of the dot is defective. A main reason for the defective indication in the whole area of the dot is a defective patterning which is generated in a manufacturing process of a TFT substrate.

A method to restore the defective patterning of TFT has been already established almost perfectly. Generally, the defective patterning is destroyed by applying a laser beam, and consequently, the operation of TFT is normalized. Or, a pixel electrode and a constant voltage signal electrode are short-circuited and connected each other by applying the laser beam, voltage of the pixel electrode is fixed to the constant voltage, and consequently, the operation of TFT is normalized On the contrary, at the present time when there is no method for removing the foreign material, there is no effective method to restore the bright point due to the tiny foreign material or the like.

For example, when the laser beam is applied to the foreign material, it is almost impossible to destroy it perfectly. Even if the foreign material is destroyed, its broken pieces may scatter into a normal area, and consequently, the area having the bright point may rather become wide.

Here, a patent document 1 (Japanese Patent Publication No. 3565327) discloses a technology related to a method for restraining a defective dot. The patent document 1 discloses a technology that makes the defective dot, which is always in a black state and whose whole area can not be controlled electrically, unnoticeable. That is, a signal applied to dots whose number is n (integer which is not smaller than 1) and which are adjacent to the defective dot is controlled, and a total brightness of n of the dots is controlled to be approximately equal to original brightness of the defective dot.

Figure 9:
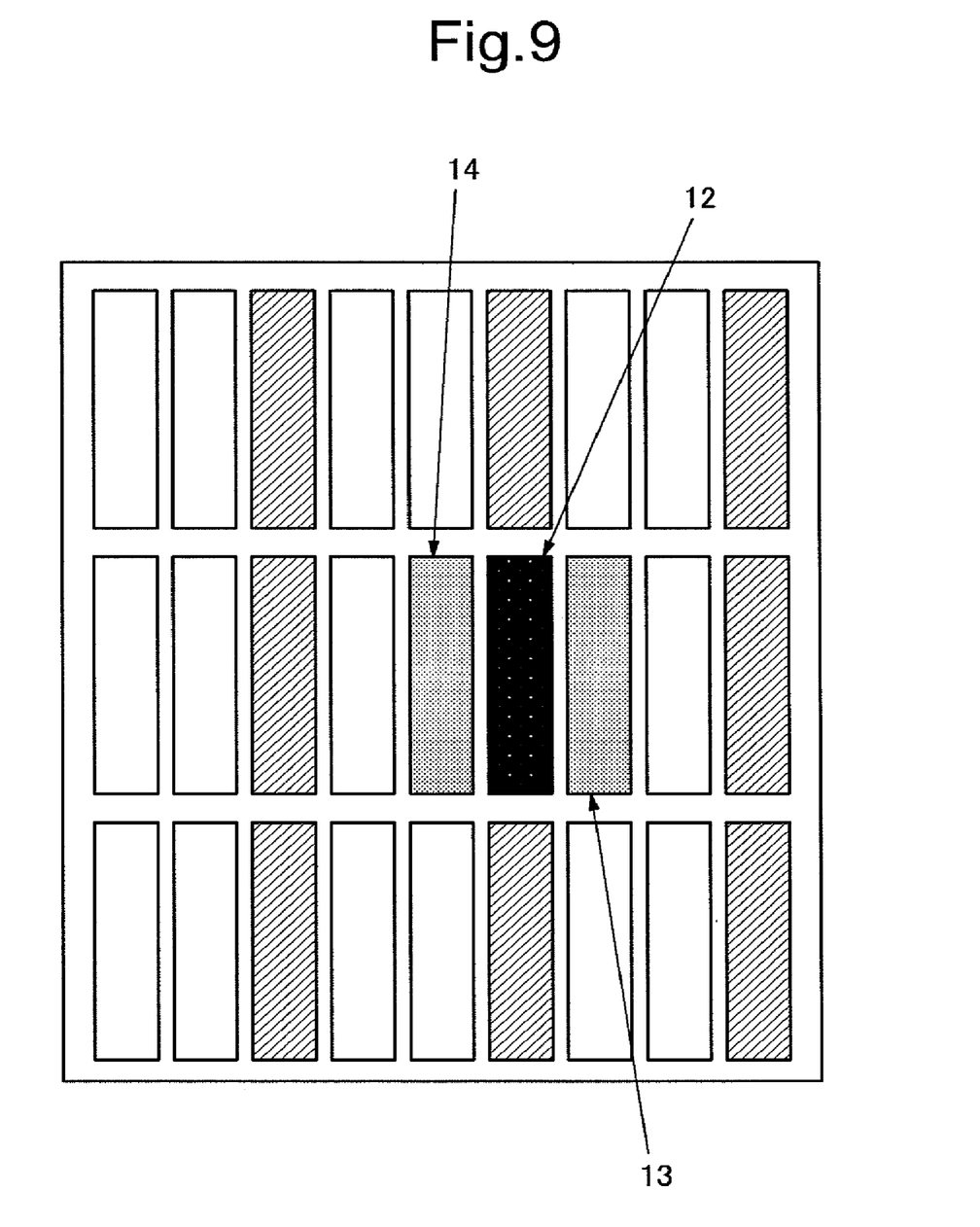
FIG. 9 is a plan view which shows a state around a defective dot of a liquid crystal display apparatus according to a related art.

FIG. 9 is a top view showing a state around a defective dot of a liquid crystal display apparatus disclosed in the patent document 1. In FIG. 9, a dot 12 is the defective dot. The defective dot 12 is always in the black state and cannot light even when a whole should light actually. Accordingly, the brightness of a dot 13 and a dot 14, which are adjacent to the defective dot 12, are controlled to make a state of a brightness generated if the dot 12 can light, and consequently, an influence of the defect is reduced visually.

SUMMARY

A main object of the present invention is to provide a liquid crystal display apparatus and a method for restraining a bright point, in which the bright point generated due to a tiny material or the like that mingle in an assembly process or the like becomes unnoticeable to an extent that no practical problem is caused with no increasing cost.

A liquid crystal display apparatus according for an exemplary object of the invention includes a plurality of dots including a control area whose display state can be controlled and at least one dot with a bright point including the control area whose display state is controlled to be in an always black state and a bright point area which is always bright.

In a method for restraining a bright point in a liquid crystal display apparatus according for an exemplary object of the invention, the liquid crystal display apparatus includes a plurality of dots including a control area whose display state can be controlled and at least one dot with a bright point including the control area and a bright point area which is always bright. Here, the method includes determining the dot with the bright point by carrying out an image display inspection to confirm whether the dot with the bright point is visible or not and controlling the control area of the determined dot with the bright point to be in an always black state.

BRIEF DESCRIPTION OF THE DRAWINGS

Exemplary features and advantages of the present invention will become apparent from the following detailed description when taken with the accompanying drawings in which.

EXEMPLARY EMBODIMENT OF THE PRESENT INVENTION

Exemplary embodiments of the present invention will now be described in detail in accordance with the accompanying drawings.

A liquid crystal display apparatus and a method for restraining a bright point according to one exemplary embodiment of the present invention are characterized as follows.

Firstly, when there is a bright point caused by a tiny material or the like which mingles in an assembly process in one of dots of a display of the apparatus (hereinafter, the dot which includes the bright point is referred to as a defective dot), the bright point is made unnoticeable by that a normal area of the defective dot is constantly made black (hereinafter, making a dot black constantly is referred to as a blackening process).

Here, the defective dot is corresponding to a dot with a bright point used in claims and the normal area is corresponding to a control area used in claims.

Secondly, the bright point is made unnoticeable by that the blackening process is carried out to the normal area of the defective dot and to at least one dot out of a plurality of dots adjacent to the defective dot. Here, the dot to which the blackening process should be carried out is selected in an order near to the defective dot, and the dots adjacent to the defective dot includes dots each which is adjacent in an every direction such as a horizontal direction, a vertical direction and a slanting direction.

Thirdly, in a liquid crystal display apparatus whose unit pixel is divided to three dots in a shape of stripe, the blackening process is carried out to at least one or both of two dots which are in contact with long sides of the defective dot as well as to the normal area of the defective dot.

Fourthly, the number of the dots to which the blackening process should be carried out is determined based on an area ratio which is a ratio of a size of an always bright area (hereinafter, referred to as bright point area) in the defective dot to a size of a whole area thereof. Here, the area ratio is a value that the size of the bright point area is divided by the size of whole area of the defective dot. Moreover, the number of the dots to which the blackening process should be carried out may be determined based on a gray scale of a display screen at which the bright point becomes visible first.

Fifthly, the blackening process can be carried out by that a hardware process using a laser beam or the like may be given to a part of the defective dot.

Next, in a monochromatic liquid crystal display apparatus of a normally black mode including a bright point, results of a survey of a gray scale of a display screen at which the bright point becomes visible first will be described. In case that there is the bright point caused by the foreign material whose diameter is about 30 μm in the monochromatic liquid crystal display of the normally black mode, the gray scales at which the bright point becomes visible first are shown in Table 1. There are the results of the four states as follows in the Table 1. That is, the first state is an initial state before the blackening process, the second state is that the blackening process is carried out to the defective dot, the third state is that the blackening process is carried out to the defective dot and one adjacent dot, and the fourth state is that the blackening process is carried out to the defective dot and two adjacent dots. Here, a brightness of the display screen is classified into 256 gray scales, and white and black are corresponding to 255th gray scale and 0th gray scale respectively.

TABLE 1

| | Initial state (before blackening process) | State in which blackening process is carried out to only defective dot | State in which blackening process is carried out to defective dot and one adjacent dot | State in which blackening process is carried out to defective dot and two adjacent dots |
| --- | --- | --- | --- | --- |
| Gray scale at which bright point becomes visible first | 136 | 112 | 84 | 56 |

In Table 1, it is clear that the number of the dots to which the blackening process should be carried out becomes large as the gray scale at which the bright point is visible first becomes low (as the display screen becomes dark). Here, in a medical monochromatic liquid crystal display apparatus, there is caused no practical problem if the bright point is not visible at 60th gray scale. So, it is preferable that the blackening process is carried out to the defective dot and not less than two adjacent dots. Further, 60th gray scale brightness is corresponding to about 2% of 255th gray scale brightness which is a brightness in white state.

Figure 8A:
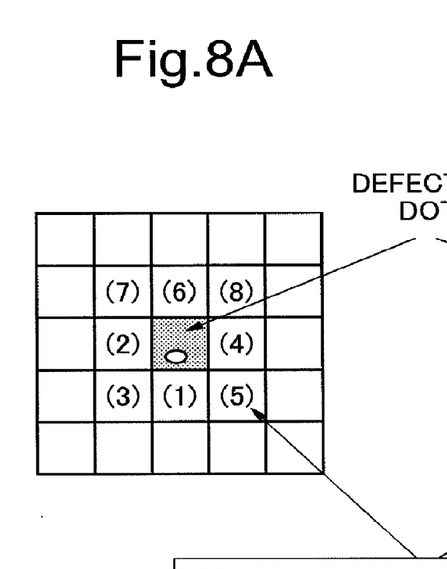
FIG. 8A is a plan view which shows an example of the order of priority regarding the blackening process for an adjacent dot according to any one of the exemplary embodiments of the present invention.
Figure 8B:
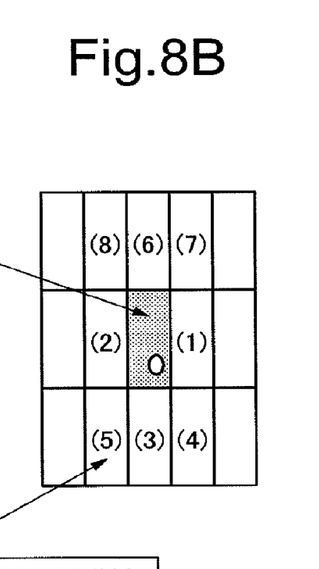
FIG. 8B is a plan view which shows an example of the order of priority regarding the blackening process for the adjacent dot according to any one of the exemplary embodiments of the present invention.

In the exemplary embodiment of the present invention, the bright point is made unnoticeable by moderating brightness of the bright point area (bright) with brightness of the blackened area (dark). Then, it is effective to select an area which is near to the bright point as an area to which the blackening process should be carried out, and it is desirable that the blackening process firstly is carried out to the defective dot which includes the bright point. Moreover, it is effective to select a dot in an order near the bright point as a dot that the blackening process should be carried out next. FIG. 8A and FIG. 8B show the order of dots to which the blackening process is carried out. As shown in FIG. 8A and FIG. 8B, the order changes depending on the structure of the dots and on the position of the bright point.

As shown in FIG. 8B, when an unit pixel is composed of dots whose shape are stripe, it is desirable that a dot which is in contact with the long side of the defective dot is selected as a dot to which the blackening process is carried out following the defective dot. When the blackening process is carried out to the dot which is in contact with the narrow side of the defective dot following the defective dot, the black display area becomes long and narrow and the defective dot becomes noticeable as a black point.

A First Exemplary Embodiment of the Present Invention

A liquid crystal display apparatus and a method for restraining a bright point according to a first exemplary embodiment of the present invention will be described in the following with FIGS. 1 to 7.

Figure 1:
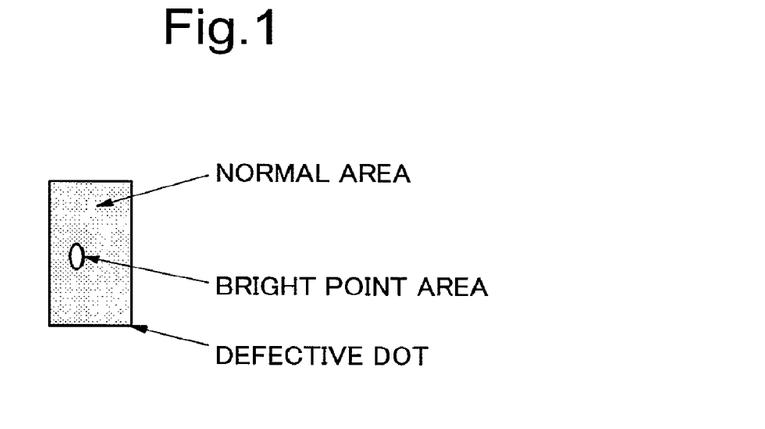
FIG. 1 is a plan view which shows an example of a structure of a defective dot.

When a tiny foreign material mingles into the liquid crystal display apparatus in normally black mode, a light leakage due to a refraction phenomenon by the foreign material, a light leakage due to disturbance of orientation of a surrounding liquid crystal and so on are caused. So, as shown in FIG. 1, a defective dot including a bright point area which is always bright is generated. In FIG. 1, other area of the defective dot except the bright point area is a normal area, and the normal area is in a normal display state and occupies almost all area of the defective dot.

Figure 2:
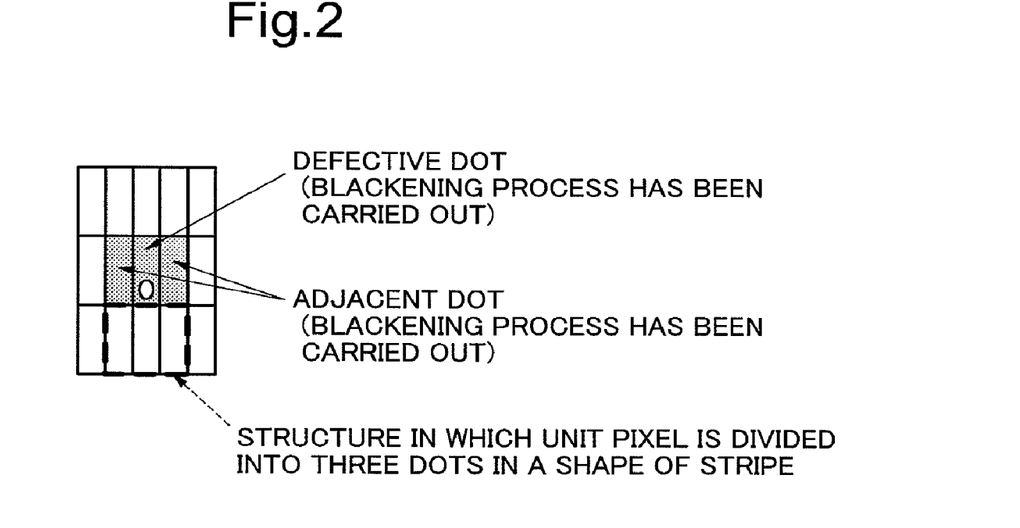
FIG. 2 is a plan view which shows an example of a structure of a pixel of a liquid crystal display apparatus according to a first exemplary embodiment of the present invention.

FIG. 2 shows a structure of a pixel of the liquid crystal display apparatus according to the exemplary embodiment of the present invention. As shown in FIG. 2, an unit pixel includes three dots each whose shape is stripe and a blackening process is carried out to two adjacent dots which are in contact with the long sides of the defective dot as well as to the defective dot.

Generally, in the liquid crystal display apparatus, a liquid crystal layer is interposed between an active matrix substrate and a substrate opposite to the active matrix substrate, and a periphery of the liquid crystal layer is sealed with a liquid crystal sealing material. Then, on the active matrix substrate, a plurality of signal wirings are formed in a column direction and a plurality of scan wirings are formed in a row direction. Moreover, on the active matrix substrate, a plurality of pixel electrodes of a matrix shape are formed corresponding to a mesh enclosed by the signal wiring and a plurality of TFT switching elements each of which controls an electrical connection between the pixel electrode and a signal wiring are formed. Meanwhile, a black matrix is formed on the opposite substrate. Then, polarizing boards are arranged outside the active matrix substrate and the opposite substrate whose inside surfaces together interpose the liquid crystal layer. The signal wiring and the scan wiring on the active matrix substrate extend to the outside of the liquid crystal sealing material, and a driving IC for supplying a data signal and a scan signal is connected to each end of the signal wiring and the scan wiring.

The liquid crystal display apparatus which is manufactured as mentioned above receives an image display inspection to confirm whether the bright point is visible or not. The image display inspection is carried out under a predetermined gray scale of the display screen at which the bright point causes a problem under a practical dark environment, for example, 60th gray scale out of 255 gray scales. If the bright point is visible in the image display inspection, the blackening process is carried out.

Figure 3A:
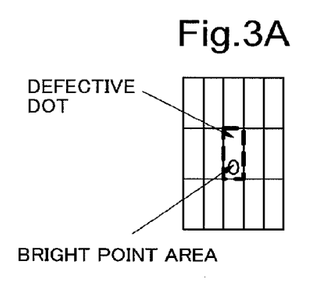
FIG. 3A is a plan view which shows the defective dot and dots adjacent to the defective dot according to the first exemplary embodiment of the present invention.
Figure 3B:
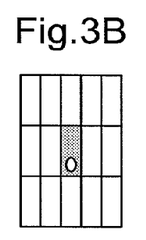
FIG. 3B is a plan view showing a state in which a blackening process is carried out to some of the adjacent dots in FIG. 3A.
Figure 3C:
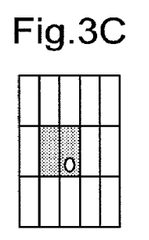
FIG. 3C is a plan view showing a state in which the blackening process is carried out to some of the adjacent dots in FIG. 3A.

Next, an example of a procedure of the blackening processes will be described with FIG. 3A to FIG. 3G When the bright point is visible in the image display inspection as shown in FIG. 3A, a process for restraining the bright point is carried out. That is, first, the blackening process is carried out to the defective dot which includes the bright point as shown in FIG. 3B. After carrying out the blackening process to the defective dot, the image display inspection is carried out again. When the bright point becomes invisible in the re-inspect, it is decided that the liquid crystal display apparatus passes the inspection. On the other hand, when the bright point is visible again, the blackening process is carried out to a dot nearest to the bright point among the dots which are in contact with the long sides of the defective dot as shown in FIG. 3C.

Figure 3D:
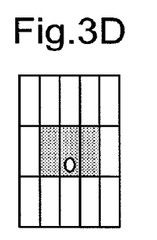
FIG. 3D is a plan view showing a state in which the blackening process is carried out to some of the adjacent dots in FIG. 3A.
Figure 3E:
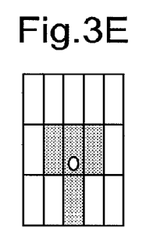
FIG. 3E is a plan view showing a state in which the blackening process is carried out to some of the adjacent dots in FIG. 3A.

Afterward, the image display inspection is carried out again. When the bright point becomes invisible, it is decided that the liquid crystal display apparatus passes the inspection. When it is visible, the blackening process is carried out to a dot to which is in contact with the long sides of the defective dot and which the blackening process has not been carried out yet as shown in FIG. 3D.

Figure 3F:
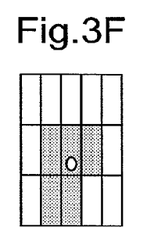
FIG. 3F is a plan view showing a state in which the blackening process is carried out to some of the adjacent dots in FIG. 3A.
Figure 3G:
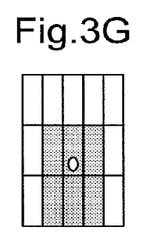
FIG. 3G is a plan view showing a state in which the blackening process is carried out to some of the adjacent dots in FIG. 3A.

Moreover, the image display inspection is carried out again, and then, it is decided that the apparatus passes the inspection if the bright point becomes invisible. If the bright point is still visible, an adjacent dot to which the blackening process has not been carried out yet is selected successively and the blackening process is carried out to the selected dot. Here, the adjacent dot is not limited to the dot which is in contact with the long side or the narrow side of the defective dot, and includes also a dot which is in contact with the corner of the defective dot. That is, the blackening process is carried out, for example, to a dot which is in contact with the narrow side of the defective dot (FIG. 3E), and more, to a dot which is in contact with the corner of the defective dot (FIG. 3F or FIG. 3G). The mentioned above procedure is continued until the bright point becomes invisible in the low gray scale display screen.

Figure 4:
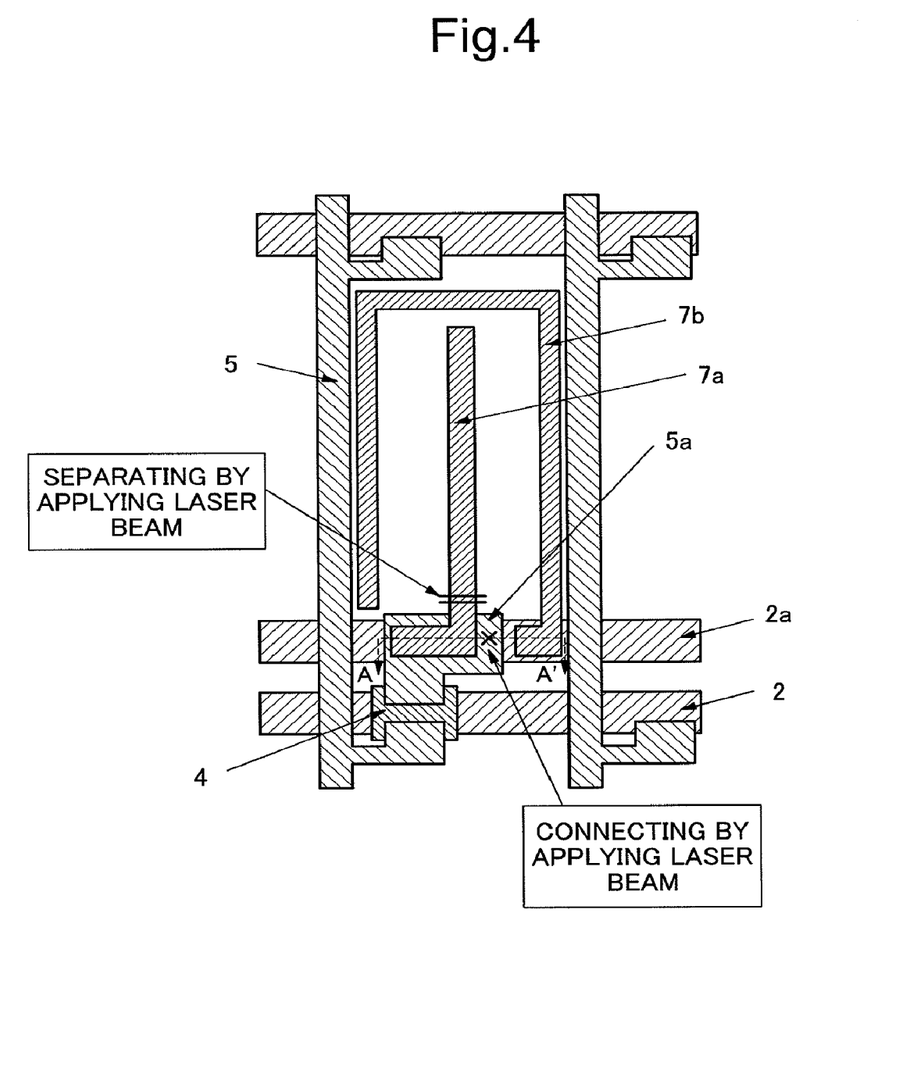
FIG. 4 is a plan view which shows an example of a structure of an active matrix substrate of the liquid crystal display apparatus according to the first exemplary embodiment of the present invention.

Next, a method of the blackening process in the liquid crystal display apparatus of the active matrix type in normally black mode will be described. In the apparatus, the pixel electrode and the opposite electrode are formed on the same substrate of this apparatus and the transverse electric field method is applied. FIG. 4 is a plan view showing a unit dot on the active matrix substrate and FIG. 5 is a cross section of main part of the unit dot (along line A-A' in FIG. 4).

Figure 5:
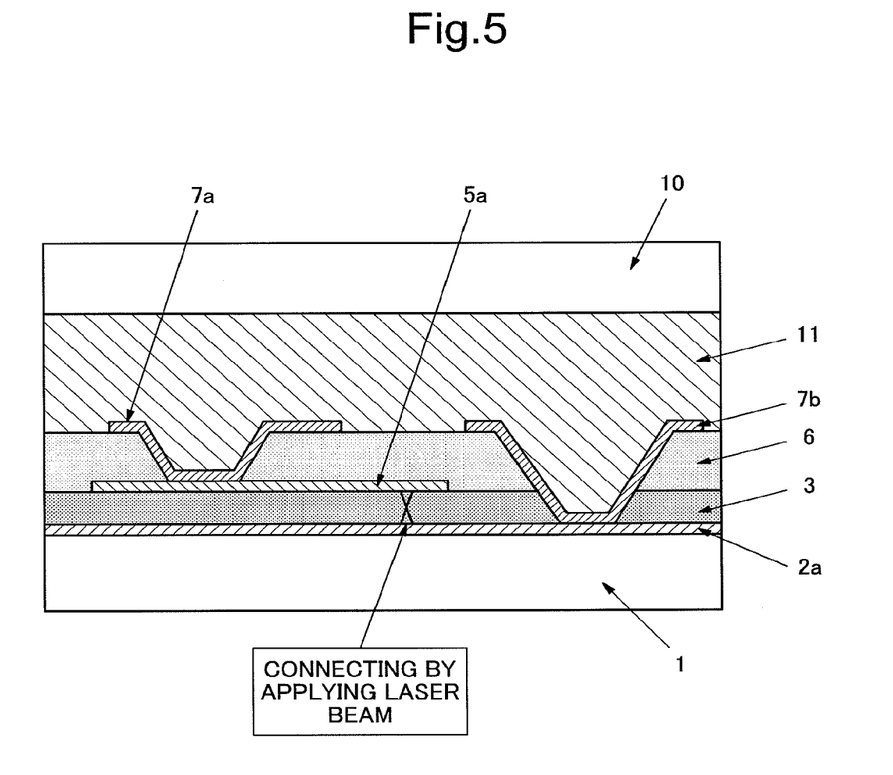
FIG. 5 is a cross section which shows an example of a structure of the liquid crystal display apparatus according to the first exemplary embodiment of the present invention.

As shown in FIG. 4 and FIG. 5, each dot includes a signal wiring 5 arranged on a active matrix substrate 1, a source electrode 5a connected electrically to the signal wiring 5 via a thin film transistor 4, a pixel electrode 7a connected electrically to the source electrode 5a, an opposite electrode 7b arranged so as to interpose a liquid crystal layer 11 with the pixel electrode 7a and a common wiring 2a connected electrically to the opposite electrode 7b. Further, as shown in FIG. 5, a gate insulation film 3 is arranged between the source electrode 5a and the common wiring 2a, and consequently, the source electrode 5a and the common wiring 2a are electrically insulated each other.

In the above-mentioned liquid crystal display apparatus, a predetermined electric potential is provided to the source electrode 5a and the pixel electrode 7a by the signal wiring 5 via the thin film transistor 4 to provide a constant electric potential between the opposite electrode 7b and each of them. Then, an orientation direction of the liquid crystal which is interposed between the opposite electrode 7b and the pixel electrode 7a is controlled by use of an electric field generated by the voltage between the opposite electrode 7b and the pixel electrode 7a, and furthermore, brightness is controlled by modulating incident light.

Here, when a bright point in the above-mentioned liquid crystal display apparatus is visible in an image display inspection, a laser beam is applied to a part of the pixel electrode 7a to which the blackening process should be carried out in order to destroy the part, as indicated by double line in FIG. 4. The pixel electrode 7a and the source electrode 5a are made electrically isolated each other, because the pixel electrode 7a is not provided with an electrical potential corresponding to the signal and it enters into an always floating state. Therefore, the electric field between the pixel electrode 7a and the opposite electrode 7b which is arranged so as to enclose the pixel electrode 7a is not generated and the dot enters into an always black display state.

Moreover, there is also a method that the laser beam is applied to a part in which the source electrode 5a and the common wiring 2a overlap via the gate insulation film 3 which the blackening process should be carried out can be applied, indicated as x in FIG. 4 and FIG. 5. The source electrode 5a and the common wiring 2a are short-circuited each other and consequently, these are connected each other. Since the pixel electrode 7a and the opposite electrode 7b have the same electric potential each other, the electric field between the pixel electrode 7a and the opposite electrode 7b is not generated. As a result, the dot enters into the always black display state.

The above-mentioned method is not limited to being applied to the liquid crystal display apparatus in the normally black mode, and can be also applicable to a liquid crystal display apparatus in a normally white mode.

Figure 6:
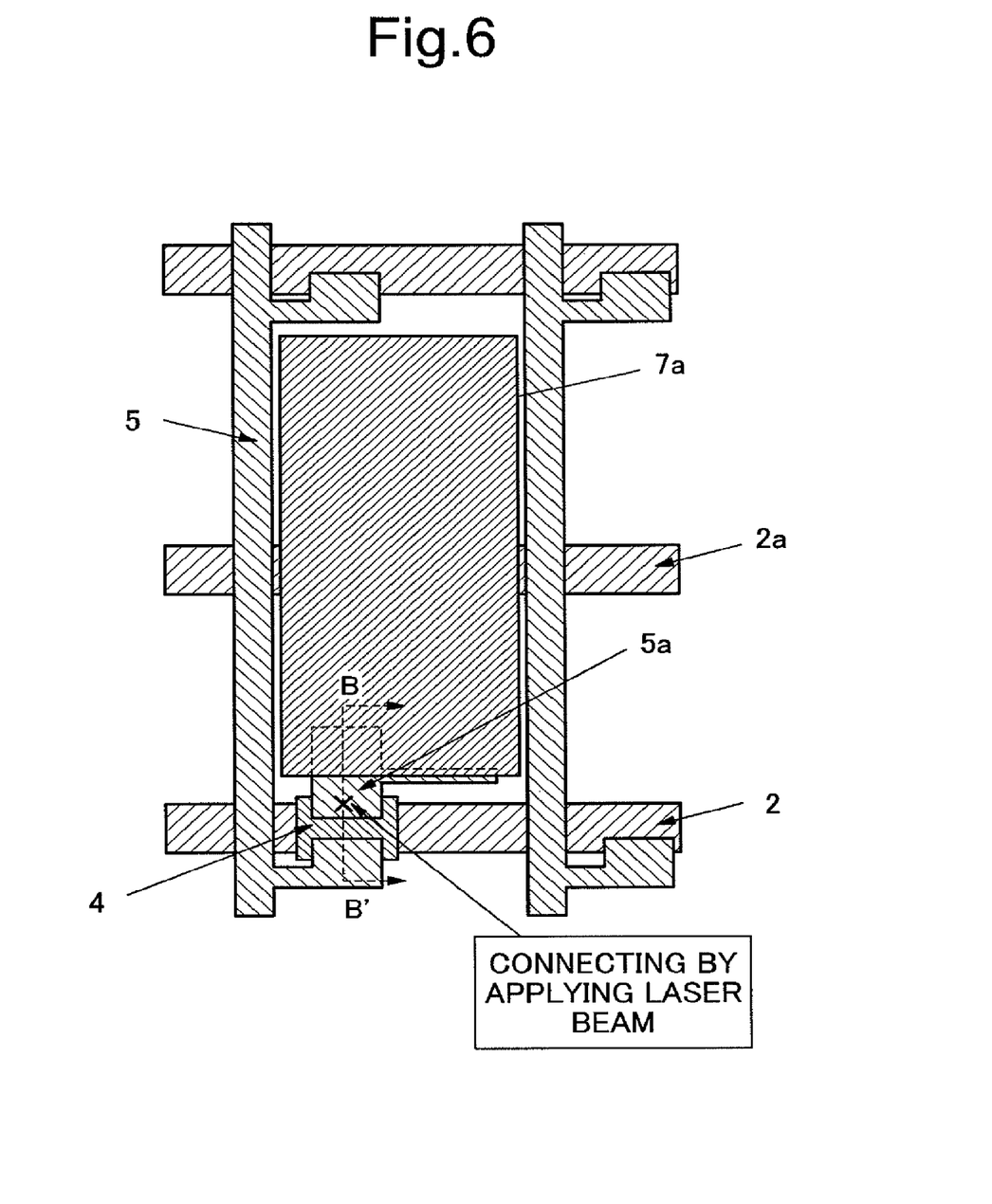
FIG. 6 is a plan view which shows an example of a structure of the active matrix substrate of the liquid crystal display apparatus according to the first exemplary embodiment of the present invention.

Next, a method of the blackening process to the dot in the liquid crystal display apparatus of the active matrix type in the normally white mode will be described. In the apparatus, the pixel electrode and the opposite electrode are formed on the same substrate. FIG. 6 is a plan view showing a unit dot on the active matrix substrate, and FIG. 7 is a cross section of a main part of the unit dot (along line B-B' in FIG. 6).

Figure 7:
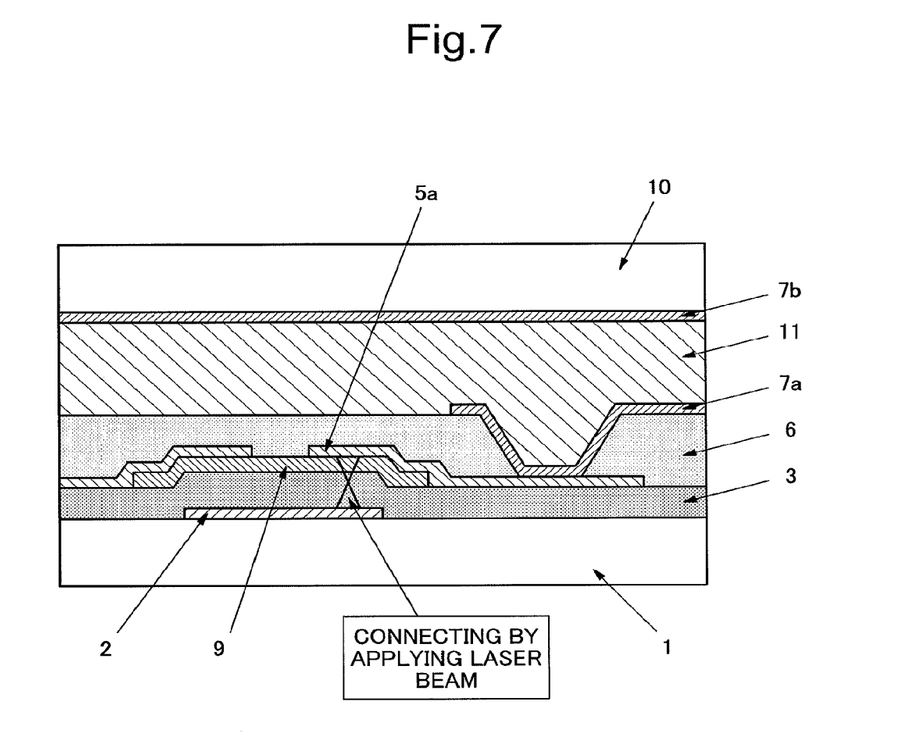
FIG. 7 is a cross section which shows an example of a structure of the liquid crystal display apparatus according to the first exemplary embodiment of the present invention.

As shown in FIG. 6 and FIG. 7, each dot includes the signal wiring 5 arranged on the active matrix substrate 1, the source electrode 5a connected electrically to the signal wiring 5 via the thin film transistor 4, a scan electrode 2 to drive the thin film transistor 4, the pixel electrode 7a connected electrically to the source electrode 5a and the opposite electrode 7b formed on an opposite substrate 10 so as to interpose the liquid crystal layer 11 with the pixel electrode 7a. As shown in FIG. 7, there is the gate insulation film 3 between the source electrode 5a and the scan electrode 2, and consequently, the source electrode 5a and the scan electrode 2 are electrically insulated each other.

In the above-mentioned liquid crystal display apparatus in the normally white mode, the laser beam applies to a part where the source electrode 5a and the common wiring 2a overlap each other via the gate insulation film 3 in the dot to which the blackening process should be carried out, as indicated as x in FIG. 6 and FIG. 7. Then, the scan electrode 2 and the source electrode 5a connected electrically to the pixel electrode 7a are connected each other. When the electric potential of the pixel electrode 7a and that of the scan electrode 2 become equivalent, the electric potential difference between the pixel electrode 7a and the opposite electrode 7b becomes equivalent to or larger than the voltage for the black display and the dot enters into the always black display state.

The method for the blackening process is not limited to the mentioned above. It can be adopted, for example, that a light shielding film is formed on an outside surface of the substrate or that unevenness are formed on a surface of the substrate or the polarizing board by use of the laser beam or the like.

Thus, in the exemplary embodiment of the present invention, while the bright point due to the tiny foreign material or the like is kept as it is, a peripheral area of the bright point area is made enter into the always black display state. Since the brightness of the bright point area seems to be moderated by the brightness of the blackened area, the bright point becomes unnoticeable even if the display screen is dark, that is, at low gray scale.

Moreover, when the normal area of the defective dot is controlled into the always black display state by carrying out the blackening process to a whole of the defective dot which includes the bright point, it is possible to utilize the visual effect maximally.

Furthermore, it is possible to carry out the blackening process with ease, because the blackening process can be attained by generally used method, that is, a TFT pattern is destroyed or is short-circuited by using the laser beam.

The liquid crystal display apparatus which has been scrapped because of including the bright point area can be restored easily to an available state, so it is possible to improve the quality and the productivity of the liquid crystal display apparatus and it is possible to realize the cost down of the liquid crystal display apparatus.

A Second Exemplary Embodiment of the Present Invention

Next, a liquid crystal display apparatus and a method for restraining the bright point according to the second exemplary embodiment of the present invention will be described.

According to the first exemplary embodiment of the present invention, after the blackening process is carried out, the image display inspection is carried out again. When the bright point is still visible, the additional blackening process and the additional image display inspection are carried out repeatedly. However, this way is low productivity.

In particular, brightness of transmitted light in the monochromatic liquid crystal display apparatus is higher than one in the color liquid crystal display apparatus and consequently, the bright point in the monochromatic liquid crystal display apparatus tends to be more visible. Accordingly, number of the adjacent dots to which the blackening process should be carried out increases in many cases and consequently, it is impossible to ignore the decline of the productivity.

Then, in the liquid crystal display apparatus of the exemplary embodiment of the present invention, the number of the adjacent dots to which the blackening process should be carried out is determined in advance based on the size of the bright point area.

Specifically, when the bright point is visible in a first image display inspection, the size of bright point area is measured. The size of the bright point area can be easily measured by using of the spot gauge or the like. Then, an area ratio which is a ratio of the size of the bright point area to a size of the defective dot is calculated. The area ratio is obtained by dividing the size of the bright point area with the size of the defective dot. Then, the number of the adjacent dots to which the blackening process should be carried out is determined based on the calculated area ratio.

Afterward, the blackening process is carried out to the defective dot and the adjacent dots whose number is determined. Here, a method of the blackening process is the same as one of the first exemplary embodiment of the present invention. Further, the dot to which the blackening process should be carried out is selected in the order near to the bright point, for example, shown in FIG. 8A or FIG. 8B.

The area ratio of the bright point area becomes large as the bright point area becomes bright, and the number of the dots to which the blackening process is required becomes large. The number can be determined, for example, with reference to Table 2.

TABLE 2

| Area ratio of bright point | Less than 3% | Not less than 3% and less than 6% | Not less than 6% and less than 9% | Not less than 9% Less than 12% | Not less than 12% |
|---|---|---|---|---|---|
| Number of the adjacent dots to which the blackening process should be carried out | 0 | 1 | 2 | 3 | Not less than 4 |

For example, in case that the diameter of the bright point area is about 30 μm in the liquid crystal display apparatus including the unit dot whose size is 60 μm×180 μm, the area ratio of the bright point area is 6.5% and the number of the dots which requires the blackening process is 2.

Here, since the effect of the blackening process is changeable dependently on the brightness of the bright point area and the brightness of the area to which the blackening process is carried out, it is necessary to determine the number of the dots to which the blackening process should be carried out depending on the kind of backlight and the characteristics of the filter and so on.

The above-mentioned method for determining the number of the dots can be not only applied to the monochromatic liquid crystal display but also to the color liquid crystal display. Furthermore, the above-mentioned method can be not only applied to the liquid crystal display apparatus in the normally black but also to one in the normally white mode.

Thus, according to the exemplary embodiment of the present invention, the number of the dots to which the blackening process should be carried out is determined based on the size of the bright point area in advance and the blackening process is carried out to the dots of the decided number at a time. Accordingly, it is possible to reduce a man-hour in the blackening process and the image display inspection, and it is possible to improve the productivity.

A Third Exemplary Embodiment of the Present Invention

Next, a liquid crystal display apparatus and a method for restraining the bright point according to the third exemplary embodiment of the present invention will be described.

According to the second exemplary embodiment of the present invention, the area ratio is calculated by the size of the bright point area and the number of the dots to which the blackening process should be carried out is determined based on the area ratio. However, when a film for diffusing light is stuck on a surface of the liquid crystal display apparatus, the leakage light which is caused by the foreign material is also diffused and an edge of the bright point area becomes obscure. Then, it is difficult to measure the size of the bright point area accurately.

In this exemplary embodiment of the present invention, the number of the dots to which the blackening process should be carried out is determined based on not the area ratio of the bright point area but the gray scale at which the bright point becomes visible first.

Specifically, when the bright point is checked visually at a first image display inspection of the monochromatic liquid crystal display in the normally black mode, the gray scale at which the bright point becomes invisible first is investigated subsequently. For example, in case that the brightness of the display screen is classified into 256 gray scales, and the white display and the black display are corresponding to 255th gray scale and 0th scale respectively, the upper limit of gray scale at which the bright point becomes invisible first is obtained by raising the gray scale of the display screen gradually. Then, the number of the dots to which the blackening process should be carried out is determined based on the obtained gray scale.

Moreover, the blackening process is carried out to the defective dot and to the dots whose number is determined as mentioned above. Here, a method of the blackening process is the same as one of the first exemplary embodiment of the present invention. Further, the dot to which the blackening process should be carried out is selected in the order near to the bright point, for example, shown in FIG. 8A or FIG. 8B.

The gray scale at which the bright point becomes visible first becomes high as the bright point area becomes bright, and the number of dots to which the blackening process is required becomes large. The number can be determined, for example, with reference to Table 3.

TABLE 3

| Gray scale at which bright point becomes visible first | Less than 85th gray scale out of 255 gray scales | 85th to 111th gray scales out of 255 gray scales | 112th to 139th gray scales out of 255 gray scales | 140th to 165th gray scales out of 255 gray scales | 166th gray scale and hereinafter out of 255 gray scales |
|---|---|---|---|---|---|
| Number of the adjacent | 0 | 1 | 2 | 3 | Not less than 4 |

TABLE 3-continued

| Gray scale at which bright point becomes visible first | Less than 85th gray scale out of 255 gray scales | 85th to 111th gray scales out of 255 gray scales | 112th to 139th gray scales out of 255 gray scales | 140th to 165th gray scales out of 255 gray scales | 166th gray scale and hereinafter out of 255 gray scales |
|---|---|---|---|---|---|
| dots to which the blackening process should be carried out | | | | | |

Here, since the brightness of each gray scale of the liquid crystal display apparatus is different dependently on the specification of the signal control circuit, it is necessary to determine the number of the dots to which the blackening process should be carried out depending on the circuit specification.

The above-mentioned method for determining the number of the dots can be not only applied to the monochromatic liquid crystal display but also to the color liquid crystal display. Furthermore, the above-mentioned method can be not only applied to the liquid crystal display apparatus in the normally black mode but also to one in the normally white mode.

Thus, according to the exemplary embodiment of the present invention, the number of the dots to which the blackening process should be carried out is determined based on the gray scale at which the bright point becomes invisible first in advance, that is, it is determined by grasping the brightness of the bright point area indirectly. Accordingly, it is possible to improve the productivity easily with no influence of the structure of the liquid crystal display apparatus.

Other Exemplary Embodiment of the Present Invention

A liquid crystal display apparatus and a method for restraining a bright point according to other exemplary embodiment of the present invention will be described. The liquid crystal display apparatus adopts the active matrix method and includes a defective dot whose part is occupied by the always bright tiny bright point area. Then, normal area of the defective dot except the bright point area is in the always black display state. Moreover, the liquid crystal display apparatus may include at least one dot which is in the always black display state among a plurality of the dots adjacent to the defective dot. Moreover, in the method for restraining the bright point, the liquid crystal display apparatus adopts the active matrix method and includes the defective dot whose part is occupied by the bright point area. Then, the bright point becomes unnoticeable by that the normal area of the defective dot is controlled to be black display state. Furthermore, in the method for restraining the bright point in a liquid crystal display apparatus, the defective dot becomes unnoticeable by that the normal area of the defective dot and at least one dot out of a plurality of dots adjacent to the defective dot are controlled to be black display state.

In the liquid crystal display apparatus according to the above mentioned exemplary embodiments, the control area of at least one the dot adjacent to the dot with the bright point is controlled to be in an always black state.

In the liquid crystal display apparatus according to the above mentioned exemplary embodiments, the dot whose control area is controlled to be in an always black state is chosen in an order near the bright point area.

In the liquid crystal display apparatus according to the above mentioned exemplary embodiments, an unit pixel of the liquid crystal display apparatus includes three dots which are in a rectangular shape, and the control area of either of or both of the dots which are in contact with long sides of the dot with the bright point is controlled to be in an always black state.

In the liquid crystal display apparatus according to the above mentioned exemplary embodiments, the number of the dots which are controlled to be in an always black state is determined corresponding to a ratio of a size of the bright point area to a whole size of the dot with the bright point.

In the liquid crystal display apparatus according to the above mentioned exemplary embodiments, the number of the dots which are controlled to be in an always black state may be determined corresponding to a display screen's gray scale at which the bright point area becomes invisible first.

In the liquid crystal display apparatus according to the above mentioned exemplary embodiments, the liquid crystal display apparatus is in normally black mode. Then, the dot includes a signal wiring, a source electrode connected to the signal wiring electrically, a pixel electrode connected to the source electrode electrically, and an opposite electrode which is arranged so as to interpose a liquid crystal layer with the pixel electrode. Here, the control area is controlled to be in an always black state by separating electrically the pixel electrode and the source electrode.

In the liquid crystal display apparatus according to the above mentioned exemplary embodiments, the liquid crystal display apparatus is in normally black mode. Then, the dot includes a signal wiring, a source electrode connected to the signal wiring electrically, a pixel electrode connected to the source electrode electrically, an opposite electrode arranged so as to interpose a liquid crystal layer with the pixel electrode, a common wiring connected to the opposite electrode electrically and an insulation film to insulate the source electrode and the common wiring each other. Here, the control area is controlled to be in an always black state by connecting electrically the pixel electrode and the opposite electrode.

In the liquid crystal display apparatus according to the above mentioned exemplary embodiments, the liquid crystal display apparatus is in a normally white mode. Then, the dot includes an active matrix substrate, an opposite substrate which interposes a liquid crystal layer with the active matrix substrate, a signal wiring arranged on the active matrix substrate, a source electrode connected to the signal wiring electrically via a thin film transistor, a scan electrode to drive the thin film transistor, a pixel electrode connected to the source electrode electrically, an insulation film to insulate the source electrode and the scan electrode each other and an opposite electrode arranged on the opposite substrate. Here, the control area is controlled to be in an always black state by that an electric potential of the pixel electrode is controlled to be constant so that a voltage between the opposite electrode and the pixel electrode becomes the same or more than a voltage during black displaying. Moreover, the control area is controlled to be in an always black state by connecting electrically the source electrode and the scan electrode.

The method for restraining the bright point according to the above mentioned exemplary embodiments further includes controlling the control area of at least one the dot adjacent to the dot with the bright point to be in an always black state.

In the method for restraining the bright point according to the above mentioned exemplary embodiments, the controlling the control area and the carrying out the image display inspection are repeated until the dot with the bright point becomes invisible.

The method for restraining the bright point according to the above mentioned exemplary embodiments further includes measuring a size of the bright point area, calculating a ratio of the measured size of the bright point area to a whole size of the dot with the bright point and determining the number of the dots which are controlled to be in an always black state corresponding to the ratio.

The method for restraining the bright point according to the above mentioned exemplary embodiments further includes finding a display screen's gray scale at which the bright point area becomes invisible first and determining the number of the dots which are controlled to be in an always black state corresponding to the display screen's gray scale.

In the method for restraining the bright point according to the above mentioned exemplary embodiments, the liquid crystal display apparatus is in normally black mode. Then, the dot includes a signal wiring, a source electrode connected to the signal wiring electrically, a pixel electrode connected to the source electrode electrically and an opposite electrode arranged so as to interpose a liquid crystal layer with the pixel electrode. Here, the method further includes destroying a part of the pixel electrode by irradiating a laser light, separating electrically the pixel electrode and the source electrode and controlling the control area to be in an always black display state.

In the method for restraining the bright point according to the above mentioned exemplary embodiments, the liquid crystal display apparatus is in normally black mode. Then, the dot includes a signal wiring, a source electrode connected to the signal wiring electrically, a pixel electrode connected to the source electrode electrically, an opposite electrode arranged so as to interpose a liquid crystal layer with the pixel electrode, a common wiring connected to the opposite electrode electrically and an insulation film to insulate the source electrode and the common wiring each other. Here, the method further includes irradiating a laser light to a position where the source electrode opposes to the common wiring via the insulation film, connecting electrically the pixel electrode and the opposite electrode and controlling the control area to be in an always black display state.

In the method for restraining the bright point according to the above mentioned exemplary embodiments, the liquid crystal display apparatus is in a normally white mode. Then, the dot includes an active matrix substrate, an opposite substrate to interpose a liquid crystal layer with the active matrix substrate, a signal wiring arranged on the active matrix substrate, a source electrode connected to the signal wiring electrically via a thin film transistor, a scan electrode to drive the thin film transistor, a pixel electrode connected to the source electrode electrically, an insulation film to insulate the source electrode and the scan electrode each other and an opposite electrode arranged on the opposite substrate. Here, the method further includes irradiating a laser light to a position where the source electrode opposes to the scan electrode via the insulation film, connecting electrically the pixel electrode and the scan electrode and controlling the control area to be in an always black display state.

While the present invention has been described with reference to each exemplary embodiment thereof mentioned above, the present invention is not limited to each exemplary embodiment thereof mentioned above. It is possible to make various changes in compositions and details without departing from the scope of the present invention. Moreover, the present invention includes an appropriate combination of a part of and a whole of compositions of each exemplary embodiment of the present invention.

Here, in case that the technology disclosed in the patent document 1 is used as the method for restraining the defective dot, it is impossible to control the defective dot in itself. While the brightness of the adjacent dot is controlled, the brightness of the defective dot in itself is not controlled. Therefore, the visual effect to make the defective dot unnoticeable is small.

Moreover, in case that the technology disclosed in the patent document 1 is used, it is necessary to install a new correction circuit, which detects an address of the defective dot and provides the adjacent dot with a signal different from an usual signal, to all the liquid crystal display apparatuses. As a result, it is impossible to avoid the cost increase of the liquid crystal display apparatus.

In contrast, in case that the liquid crystal display apparatus and the method for restraining the bright point according to the present invention are used as the method for restraining the defective dot, it is possible to make the bright point, which is generated due to the tiny foreign material or the like mingled in the assembly process, unnoticeable to an extent that the practical problem is not caused in restraint of cost up of the liquid crystal display apparatus. The reason is that in case that the normal area of the defective dot is made blackened always, it is possible to make the brightness of whole of the defective dot low relatively since a human eye grasps brightness as a sum of the brightness of the bright point area of the defective dot and the brightness of the normal area of the defect dot.

Moreover, the reason is that in case that the dot adjacent to the defective dot including the bright point is made blackened always, it is possible to make the brightness of area including the defective dot low relatively since a human eye grasps brightness as a sum of the brightness of the defective dot and the brightness of the adjacent dot.

Furthermore, since it is enough to carry out a simple machining process such as the laser beam machining only to the liquid crystal display apparatus which includes the bright point, it is unnecessary to install a new correction circuit or the like to all the liquid crystal display apparatuses.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:
1. A liquid crystal display apparatus, comprising:
a plurality of dots including a control area whose display state can be controlled; and at least one dot with a bright point including said control area whose display state is controlled to be in an always black state and a bright point area which is always bright.

2. The liquid crystal display apparatus according to claim 1, wherein
said control area of at least one said dot adjacent to said dot with said bright point is controlled to be in an always black state.

3. The liquid crystal display apparatus according to claim 2, wherein
said dot whose control area is controlled to be in an always black state is chosen in an order near said bright point area.

4. The liquid crystal display apparatus according to claim 2, wherein
an unit pixel of said liquid crystal display apparatus includes three dots which are in a rectangular shape, and wherein
said control area of either of or both of said dots which are in contact with long sides of said dot with said bright point is controlled to be in an always black state.

5. The liquid crystal display apparatus according to claim 2, wherein
the number of said dots which are controlled to be in an always black state is determined corresponding to a ratio of a size of said bright point area to a whole size of said dot with said bright point.

6. The liquid crystal display apparatus according to claim 2, wherein
the number of said dots which are controlled to be in an always black state is determined corresponding to a display screen's gray scale at which said bright point area becomes invisible first.

7. The liquid crystal display apparatus according to claim 1, wherein
said liquid crystal display apparatus is in normally black mode, wherein
said dot includes a signal wiring, a source electrode connected to said signal wiring electrically, a pixel electrode connected to said source electrode electrically and an opposite electrode which is arranged so as to interpose a liquid crystal layer with said pixel electrode, and wherein
said control area is controlled to be in an always black state by separating electrically said pixel electrode and said source electrode.

8. The liquid crystal display apparatus according to claim 1, wherein
said liquid crystal display apparatus is in normally black mode, wherein
said dot includes a signal wiring, a source electrode connected to said signal wiring electrically, a pixel electrode connected to said source electrode electrically, an opposite electrode arranged so as to interpose a liquid crystal layer with said pixel electrode, a common wiring connected to said opposite electrode electrically and an insulation film to insulate said source electrode and said common wiring each other, and wherein
said control area is controlled to be in an always black state by connecting electrically said pixel electrode and said opposite electrode.

9. The liquid crystal display apparatus according to claim 1, wherein
said liquid crystal display apparatus is in a normally white mode, wherein
said dot includes an active matrix substrate, an opposite substrate which interposes a liquid crystal layer with said active matrix substrate, a signal wiring arranged on said active matrix substrate, a source electrode connected to said signal wiring electrically via a thin film transistor, a scan electrode to drive said thin film transistor, a pixel electrode connected to said source electrode electrically, an insulation film to insulate said source electrode and said scan electrode each other and an opposite electrode arranged on said opposite substrate, and wherein
said control area is controlled to be in an always black state by that an electric potential of said pixel electrode is controlled to be constant so that a voltage between said opposite electrode and said pixel electrode becomes the same or more than a voltage during black displaying.

10. The liquid crystal display apparatus according to claim 9, wherein
said control area is controlled to be in an always black state by connecting electrically said source electrode and said scan electrode.

11. A method for restraining a bright point in a liquid crystal display apparatus, wherein
said liquid crystal display apparatus includes a plurality of dots including a control area whose display state can be controlled and at least one dot with a bright point including said control area and a bright point area which is always bright, and comprising,
determining said dot with said bright point by carrying out an image display inspection to confirm whether said dot with said bright point is visible or not; and
controlling said control area of said determined dot with the bright point to be in an always black state.

12. The method for restraining the bright point according to claim 11, further comprising:
controlling said control area of at least one said dot adjacent to said dot with said bright point to be in an always black state.

13. The method for restraining the bright point according to claim 12,
wherein said controlling said control area and said carrying out said image display inspection are repeated until said dot with said bright point becomes invisible.

14. The method for restraining the bright point according to claim 12, further comprising:
measuring a size of said bright point area;
calculating a ratio of said measured size of said bright point area to a whole size of said dot with said bright point; and
determining the number of said dots which are controlled to be in an always black state corresponding to said ratio.

15. The method for restraining the bright point according to claim 12, further comprising:
finding a display screen's gray scale at which said bright point area becomes invisible first; and
determining the number of said dots which are controlled to be in an always black state corresponding to said display screen's gray scale.

16. The method for restraining the bright point according to claim 11, wherein
said liquid crystal display apparatus is in normally black mode, wherein
said dot includes a signal wiring, a source electrode connected to said signal wiring electrically, a pixel electrode connected to said source electrode electrically and an opposite electrode arranged so as to interpose a liquid crystal layer with said pixel electrode, and wherein
said method, further comprising:
destroying a part of said pixel electrode by irradiating a laser light;

separating electrically said pixel electrode and said source electrode; and controlling said control area to be in an always black display state.

17. The method for restraining the bright point according to claim 11, wherein said liquid crystal display apparatus is in normally black mode, wherein said dot includes a signal wiring, a source electrode connected to said signal wiring electrically, a pixel electrode connected to said source electrode electrically, an opposite electrode arranged so as to interpose a liquid crystal layer with said pixel electrode, a common wiring connected to said opposite electrode electrically and an insulation film to insulate said source electrode and said common wiring each other, and wherein said method, further comprising:

irradiating a laser light to a position where said source electrode opposes to said common wiring via said insulation film;

connecting electrically said pixel electrode and said opposite electrode; and controlling said control area to be in an always black display state.

18. The method for restraining the bright point according to claim 11, wherein said liquid crystal display apparatus is in a normally white mode, wherein said dot includes an active matrix substrate, an opposite substrate to interpose a liquid crystal layer with said active matrix substrate, a signal wiring arranged on said active matrix substrate, a source electrode connected to said signal wiring electrically via a thin film transistor, a scan electrode to drive said thin film transistor, a pixel electrode connected to said source electrode electrically, an insulation film to insulate said source electrode and said scan electrode each other and an opposite electrode arranged on said opposite substrate, and wherein said method, further comprising:

irradiating a laser light to a position where said source electrode opposes to said scan electrode via said insulation film;

connecting electrically said pixel electrode and said scan electrode; and controlling said control area to be in an always black display state.

* * * * *